United States Patent
Aubin

(10) Patent No.: US 8,387,209 B2
(45) Date of Patent: Mar. 5, 2013

(54) CASTER WITH DUAL OFFSET ORBITAL MOUNTING ASSEMBLY

(76) Inventor: Philip A. Aubin, Tracy, CA (US)

(*) Notice: Subject to any disclaimer, the term of this patent is extended or adjusted under 35 U.S.C. 154(b) by 0 days.

(21) Appl. No.: 13/136,863

(22) Filed: Aug. 12, 2011

(65) Prior Publication Data

US 2012/0042472 A1 Feb. 23, 2012

Related U.S. Application Data

(60) Provisional application No. 61/374,700, filed on Aug. 18, 2010.

(51) Int. Cl.
*B60B 33/00* (2006.01)
(52) U.S. Cl. .................. 16/31 R; 16/20; 16/48
(58) Field of Classification Search .............. 16/45, 46, 16/20, 29, 31 R, 31 A, 47, 18 B
See application file for complete search history.

(56) References Cited

U.S. PATENT DOCUMENTS

| | | | | |
|---|---|---|---|---|
| 698,963 A | * | 4/1902 | Kennedy | 16/47 |
| 1,899,394 A | * | 2/1933 | Noelting et al. | 16/38 |
| 2,541,514 A | * | 2/1951 | Herold | 295/8.5 |
| 3,433,500 A | * | 3/1969 | Christensen | 280/79.2 |
| 3,547,459 A | * | 12/1970 | Lapham | 280/79.2 |
| 4,321,727 A | * | 3/1982 | Sheiman et al. | 16/18 R |
| 4,342,134 A | * | 8/1982 | Mickelson | 16/31 R |
| 6,453,212 B1 | * | 9/2002 | Asama et al. | 700/245 |
| 6,499,184 B2 | * | 12/2002 | Plate | 16/44 |
| 6,880,203 B1 | * | 4/2005 | Aubin | 16/48 |
| 7,065,828 B2 | * | 6/2006 | Sorensen | 16/45 |
| 2004/0145135 A1 | * | 7/2004 | Wintersgill et al. | 280/33.991 |
| 2010/0247281 A1 | | 9/2010 | Kempf | |

FOREIGN PATENT DOCUMENTS

JP 04159102 A * 6/1992

* cited by examiner

*Primary Examiner* — Chuck Y. Mah
(74) *Attorney, Agent, or Firm* — Howard Cohen

(57) ABSTRACT

A caster assembly has a dual pivot assembly in the caster mounting that is laterally offset, whereby the caster wheels may not only pivot about a wheel pivot axis that extends through the plane of the caster wheel, but also revolve orbitally about a mounting pivot axis that is laterally offset from and parallel to the wheel axis. A transfer plate supports a pair of bearing assemblies, one of them securing a mounting post secured to the bottom of an object. The other bearing assembly supports a cylindrical head post that extends to a clevis-like bracket that supports a caster wheel.

7 Claims, 3 Drawing Sheets

CASTER WITH DUAL OFFSET ORBITAL MOUNTING ASSEMBLY

CROSS-REFERENCE TO RELATED APPLICATIONS

This application claims the priority benefit of the filing date of Provisional Application No. 61/374,700, filed Aug. 18, 2010.

FEDERALLY SPONSORED RESEARCH

Not applicable.

SEQUENCE LISTING, ETC ON CD

Not applicable.

BACKGROUND OF THE INVENTION

1. Field of the Invention

This invention relates to casters and, more particularly, to caster assemblies that allow the caster to pivot easily to accommodate the direction of thrust applied to an object supported by the caster.

2. Description of Related Art

Caster designs tend to fall into one of two groups: the 'single wheel' and the 'twin wheel'. The single wheel caster consists of one wheel with an axle through the center which is attached to a clevis-like bracket that supports the axle at opposed ends. The bracket is joined to a bearing assembly that allows the caster to pivot about a generally vertical axis while also permitting rotation of the wheel about a generally horizontal axis, thereby allowing the caster to roll in any direction. The bracket is offset from vertical by a head angle, and the bracket may include a rake offset, so that the caster bracket will tend to rotate about the pivot axis and extend in a direction that is directly opposed to the direction of motion of the object supported by the caster. This arrangement, known in the The main problem of the 'single wheel' caster is its inability to turn easily about the pivot. When changing direction, the wheel is required to rotate about the vertical axis of the bracket bearing assembly. Differing portions of the contact area of the wheel describe arcs of differing radii, requiring differing linear velocities, thus necessitating that some of the contact area is in rolling contact while other portions are sliding and dragging ("scrubbing"). The result is wear of the wheel and greater rolling resistance at low speeds and tight turns, and most particularly high rolling resistance during startup from zero velocity. A narrower wheel minimizes this problem, but results in greater pressure (force per unit area) applied to the floor surface.

The 'twin wheel' caster offered an improvement over the 'single wheel' in two important regards. The ability of the wheels to rotate at differing rates or in opposite directions at the same time greatly enhances the ability to turn about the vertical pivot axis, making a change in overall direction of the object much smoother. Also, the separation of the two wheels establishes a wide base for stability. One problem germane to this caster type is the method of attachment of the wheel to the axle. Unlike the single wheel with the clevis bracket supporting the outer ends of the axle, the double wheel design typically attaches each wheel to its respective end of the axle, the vertical pivot shaft being disposed in a plane between the two wheels. The wheels and the ends of the shaft are relatively unprotected and vulnerable to impact, which can result in collision-damaged wheels or a bent axle. This attachment configuration also creates some inherent stability inefficiencies. By not allowing the axle to extend through the wheel, the loading of the wheel on the axle is not symmetric. That is, the inside of the wheel is fully loading the axle while the outside is not loading the axle at all. Also, the limited space remaining in the device for the wheel thickness results in thin wheels, which directly result in narrow annular (limited) bearing surfaces of the wheel on the axle. The twin wheel design is typically limited to use in office furniture, where the loads are lighter and the objects are not often moved.

A problem that is common to single wheel and twin wheel casters is that the casters can become "locked up" when at least two casters supporting a wheeled object are pivoted to extend in directions that are substantially misaligned with each other. For example, if a cart with four swiveling (pivoting) casters is pushed toward a wall and abutted against the wall surface, it may then become difficult to slide the cart along the wall to reposition it, due to the fact that the casters are misaligned with respect to the plane of the wall surface. In general, when casters, either single wheel or twin wheel, are forced to pivot about the contact area that they engage on a floor or carpet, their rotational movement creates a substantial frictional resistance due to the fact that the wheels are not primarily rolling but rather are "scrubbing" on the contact area. The result is that objects supported by casters may be difficult to start to roll in a desired direction if that direction does not align with the casters. And precision placement of the object may involve a great deal more maneuvering than would otherwise be necessary if the casters were capable of easily tracking the direction of thrust.

BRIEF SUMMARY OF THE INVENTION

The present invention generally comprises a caster assembly that enables the caster wheel to easily align itself with the direction of thrust applied to a caster-supported object. This advantageous feature is made possible by providing a dual pivot assembly in the caster mounting that is laterally offset, whereby the caster wheels may not only pivot about a wheel pivot axis that extends through the plane of the caster wheel, but also revolve orbitally about a mounting pivot axis that is laterally offset from the wheel axis. As a result, the caster assembly easily may assume the proper orientation for any thrust applied to the caster-supported object, whereby caster "lock-up" is eliminated.

The caster assembly is comprised of a transfer plate that is provided with a pair of cylindrical openings extending side-by-side in the plate and laterally offset. A pair of bearing assemblies are provided, each secured in a respective one of the openings. Joined in and extending through one of the bearing assemblies is a mounting post that extends to a mounting plate adapted to be secured to the bottom surface of an object. The mounting plate is fixed to the object, and the transfer plate is free to rotate about the axis of the mounting tube on its respective bearing assemblies.

The other bearing assembly supports a cylindrical head post that extends to a clevis-like bracket that straddles a wheel and supports at the clevis ends an axle for the wheel, as is known in the prior art. The clevis has a head angle that is typical for a caster wheel, and the wheel is free to rotate about the axis of the head post, which in turn is supported by the transfer plate, which itself is rotatable about the axis of the mounting tube. Thus the caster wheel may roll on its axle on a floor surface, and revolve about the pivot axis of the head post, and also rotate orbitally about the axis of the mounting tube. These three axes of movement enable the caster wheel easily to move into the proper alignment for any thrust applied to the object supported by the caster. Indeed, if the caster is "locked up", that is, transverse to the thrust on the object, the object appears to pivot about the locked up wheel, using the orbital motion of the transfer plate, until the thrust vector more closely aligns with the wheel direction, after which the wheel may pivot into aligned orientation with the thrust vector.

DETAILED DESCRIPTION OF THE INVENTION

Figure 1:
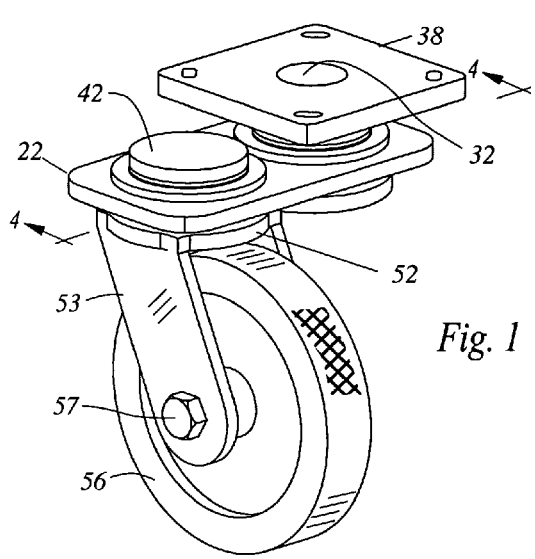
FIG. 1 is a perspective elevation of the caster assembly of the present invention.

The present invention generally comprises a caster assembly that enables the caster wheel to easily align itself with the direction of thrust applied to a caster-supported object. With regard to FIGS. 1-3 and 9, the caster assembly 21 is composed of a transfer plate 22, which is a high strength plate (steel or the like) having two cylindrical openings 23 and 24 extending along adjacent, generally parallel axes A and B respectively. A mounting bearing assembly 26 includes a bearing housing tube 27 that is pressed into the opening 24 and supports upper and lower ball bearing races 28 and 29. A mounting post 32 has an annular shoulder 33 that defines an upper end 34. The upper end 34 of the post 32 is received in an opening 37 of a mounting plate 38. Note that the end 34 may be pressed into the opening 37 or welded thereat, and that the annular shoulder 33 is abutting the surface of the plate 38 to form a wide engagement that prevents any movement of the post 32. It may be appreciated that the transfer plate 22 is freely rotatable about the mounting post 32 on bearings 28 and 29.

A head bearing assembly 46 includes a bearing housing tube 47 (similar to tube 27) that is pressed into the opening 23 and supports upper and lower ball bearing races 48 and 49. A head post 42 has a radial flange 43 at the upper end thereof. The head post 42 extends through the bearing races 48 and 49, with the flange 43 abutting the upper bearing race 48. A clevis bracket 51 is comprised of a central web portion 52 extending transversely to the axis A, with an opening 54 extending coaxially through the web 52. A pair of arms 53 extend in parallel fashion from opposite sides of the central web 52, and support a wheel 56 on an axle 57 as is well-known in the prior art. The lower end of head post 42 is dimensioned to be received and secured in the opening 54 of the clevis bracket, as by press fit, weldment, or the like. As shown best in FIGS. 1-3, the arms 53 are parallel to axis A, and equally spaced apart therefrom. In addition, the arms 53 are oriented at a head angle that is typical for a caster wheel, so that the wheel 56 is free to rotate about the axis A of the head post 42, as well as to revolve about the axle 57. The head angle enables the caster wheel to trail in the direction opposite to the velocity vector of the caster's path, as is known in the prior art.

Figure 5:
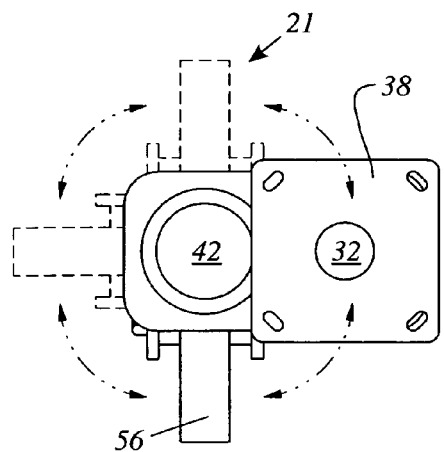
FIGS. 5 and 6 are plan views of the caster assembly and its orbital and rotational movements.
Figure 6:
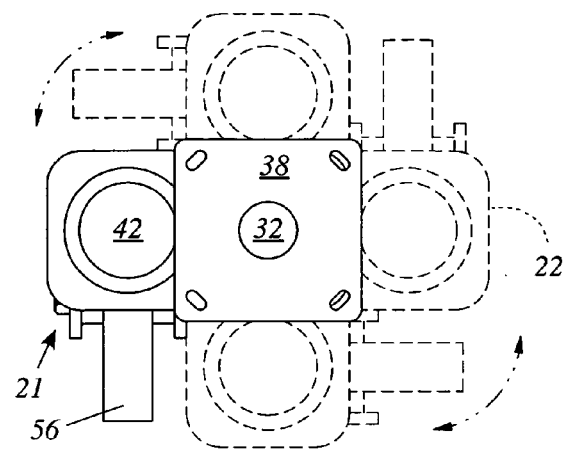

The structure of the caster assembly provides two independent, parallel rotating mechanisms between the caster wheel and the supported object (the load), and these two mechanisms combine to enable greater freedom of movement of the wheel. The caster wheel may roll on its axle on a floor surface, and rotate about the pivot axis of the head post, and also rotate orbitally (circularly) about the axis of the mounting tube. These three axes of movement enable the caster wheel easily to move into the proper alignment for any thrust applied to the object supported by the caster. For example, as shown in FIG. 5, the clevis bracket 51 and wheel 56 may rotate freely about the head post 42 to assume any directional orientation. In addition, and at the same time the transfer plate 22 may rotate about the mounting post 32 in orbital fashion, as shown in FIG. 6.

Figure 8:
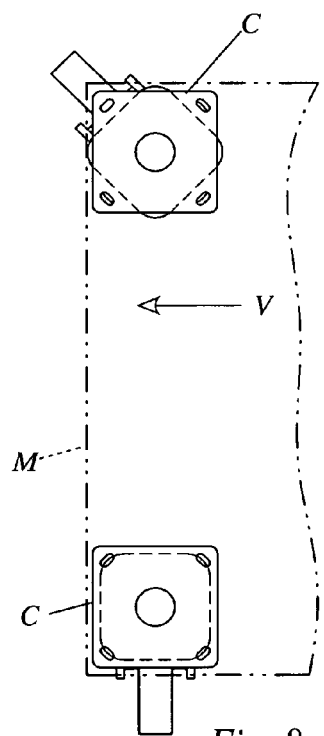
FIG. 8 is a plan view as in FIG. 7, showing an object supported by two prior art casters arrayed in similar conflicting orientations.
Figure 9:
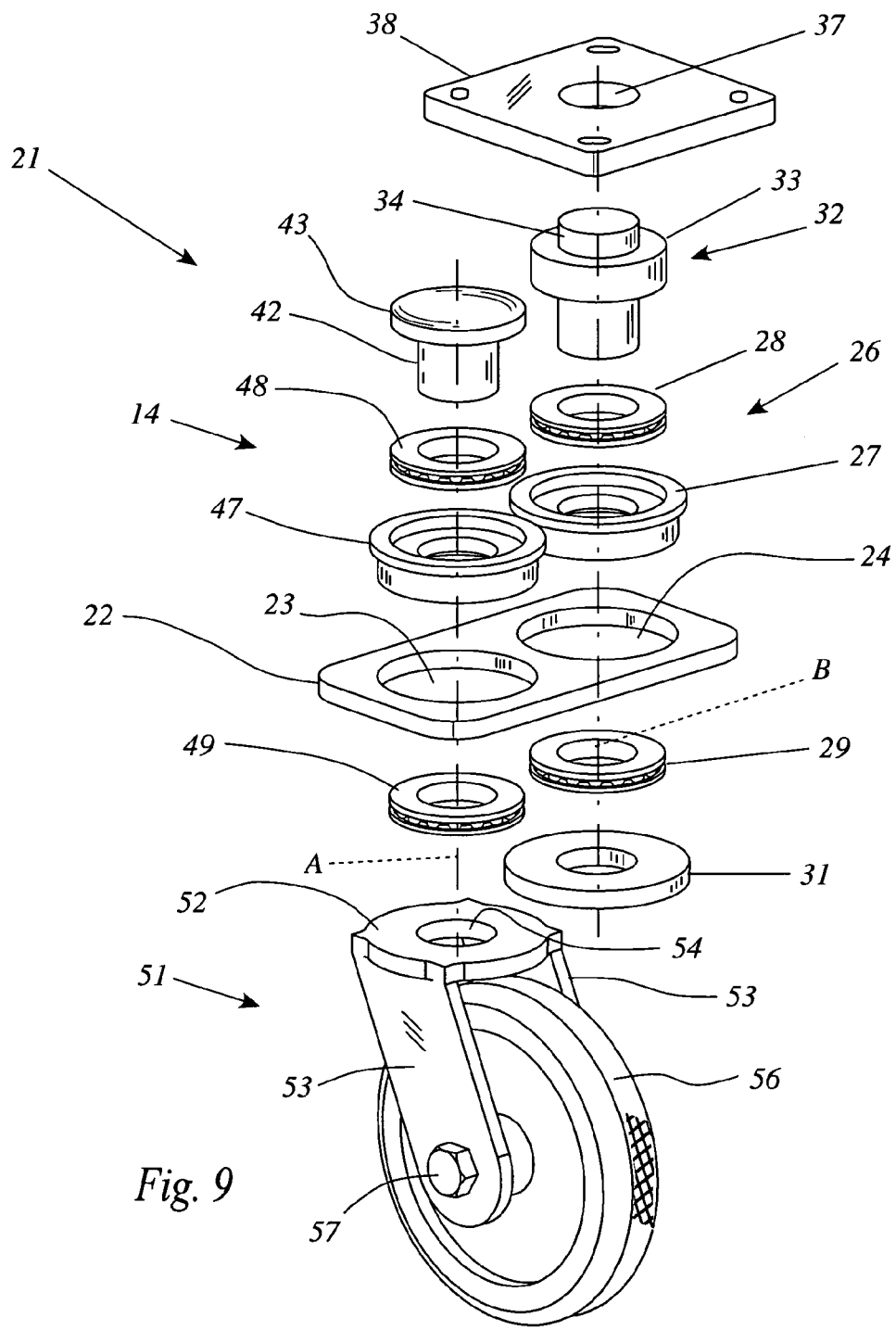
FIG. 9 is an exploded view of the components of the caster assembly of the present invention.

To illustrate one example of the benefits of the double pivot of the invention, FIG. 8 depicts a situation in the prior art in which an object M has two typical swivel casters C mounted at adjacent corners of the object. The caster wheels are oriented obliquely transversely to the thrust vector V that is applied to the object M. As a result, it is difficult to initiate motion of the object M until the wheels can pivot to align in a trailing direction relative to vector V. And it is difficult to pivot and align the wheels without some object movement. This is the "lock up" situation referenced previously.

Figure 7:
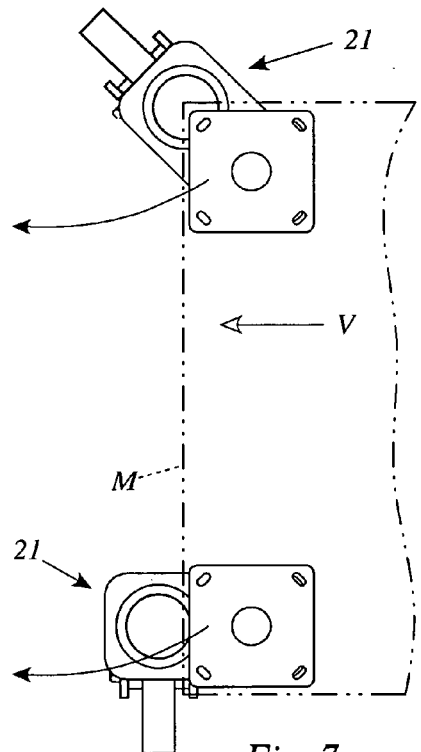
FIG. 7 is a plan view of two caster assemblies supporting an object, the caster wheel arrayed in conflicting directions.

With regard to FIG. 7, in the same situation the casters 21 of the invention enable easy initial movement, due to the dual pivot design. Indeed, if 5 the wheel misalignment tends to block movement of the object M in the thrust direction, the thrust vector V may urge the object M to rotate about the axes A or B, where there is freedom of motion, as suggested by the arrow in FIG. 7. It is apparent that the orbital motion of the transfer plate 22 enables object motion in the zero velocity "lock-up" situation, thereby alleviating a notable problem in the prior art. Thereafter the wheels will orient themselves and rolling movement of object M in the direction V will proceed smoothly. The ability of the double pivot orbital caster assembly to overcome the "lock-up" problem is not limited to the geometries of the example of FIG. 7; indeed, it is applicable to all caster wheel directional orientations that may be expected.

Figure 2A:
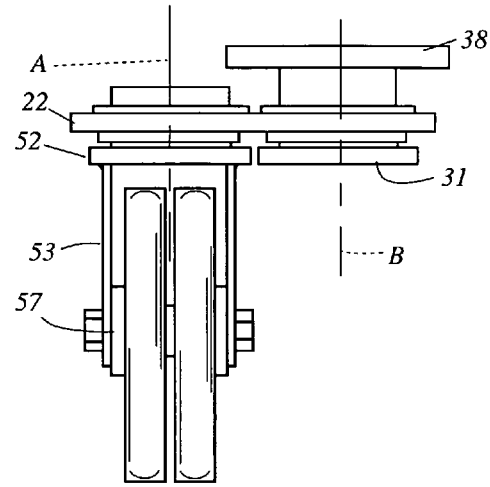
FIGS. 2A and 2B are elevations depicting two similar embodiments of the caster assembly of the invention.
Figure 2B:
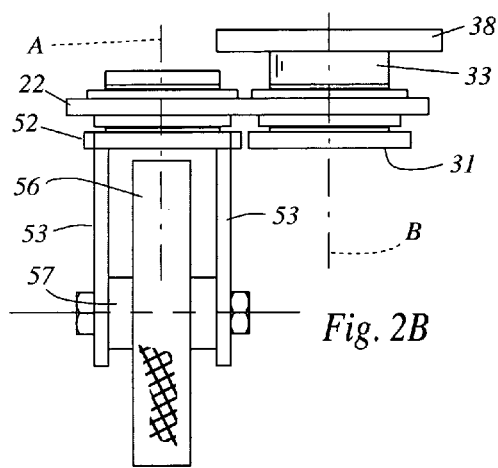
Figure 3:
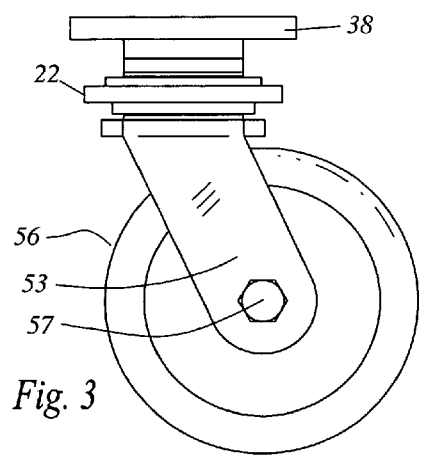
FIG. 3 is a side elevation of the caster assembly of the invention.
Figure 4:
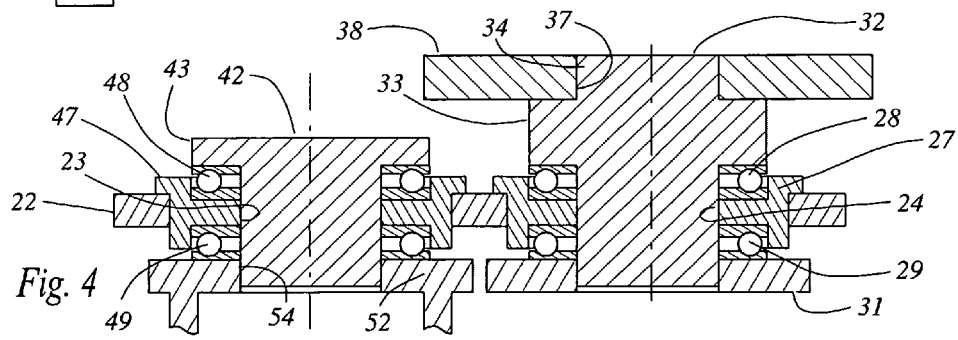
FIG. 4 is a cross-sectional detail taken along line 4-4 of FIG. 1.

Note that FIG. 2A depicts the caster assembly described above, except that it is fitted with a split-tread single wheel, as described in U.S. Pat. No. 6,880,203, issued to Phillip Aubin on Apr. 19, 2005. A side-by-side twin wheel arrangement secured in clevis bracket 51 is also within the scope of the invention.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:
1. A caster assembly, including:
a mounting plate adapted to be fastened to an object;

a transfer plate, and first and second bearing assemblies supported by said transfer plate in side-by-side, parallel relationship;

a mounting post extending downwardly from said mounting plate and rotatably received in said first bearing assembly;

said first bearing assembly including upper and lower first ball bearing races arranged in vertically stacked fashion to support said mounting post in vertical load supporting fashion;

a head post rotatably received in said second bearing assembly, said second bearing assembly including upper and lower second ball bearing races arranged in vertically stacked fashion to support said head post in vertical load supporting fashion;

and bracket means extending from said head post to support a caster wheel in ground-engaging, rotatable fashion, whereby said bracket means may revolve about said head post to move said caster wheel to any directional angle about said head post, and said transfer plate may rotate about said mounting post to move said bracket means in orbital fashion to any angle about said mounting post.

2. The caster assembly of claim 1, wherein said first and second bearing assemblies are aligned along first and second rotational axes, respectively, said first and second axes extend generally parallel, and said upper and lower first bearing races are disclosed parallel and laterally offset from said upper and lower second bearing races.

3. The caster assembly of claim 2, wherein said bracket means includes a clevis bracket that straddles said caster wheel and supports a wheel axle extending horizontally that supports said caster wheel.

4. The caster assembly of claim 3, wherein said wheel axle extends generally transversely to said first and second axes.

5. The caster assembly of claim 3, wherein said clevis bracket is provided with a head angle to establish a lateral offset between said wheel axle and said second rotational axis.

6. The caster assembly of claim 1, wherein said transfer plate comprises a generally planar web having first and second cylindrical openings formed therein in side-by-side fashion, said first and second bearing assemblies including first and second bearing tubes secured in said first and second cylindrical openings, respectively in parallel, laterally offset fashion and supporting said first and second bearing races, respectively.

7. The caster assembly of claim 1, wherein said mounting plate is fastened to a bottom Surface of the object.

* * * * *